Aug. 31, 1926.
H. A. MILLER
BABBITTING JIG
Filed Nov. 27, 1925
1,598,540
3 Sheets-Sheet 1
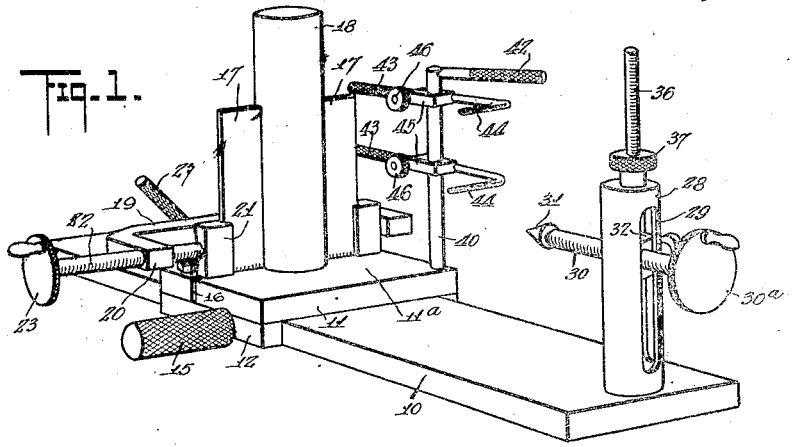
Fig. 1.
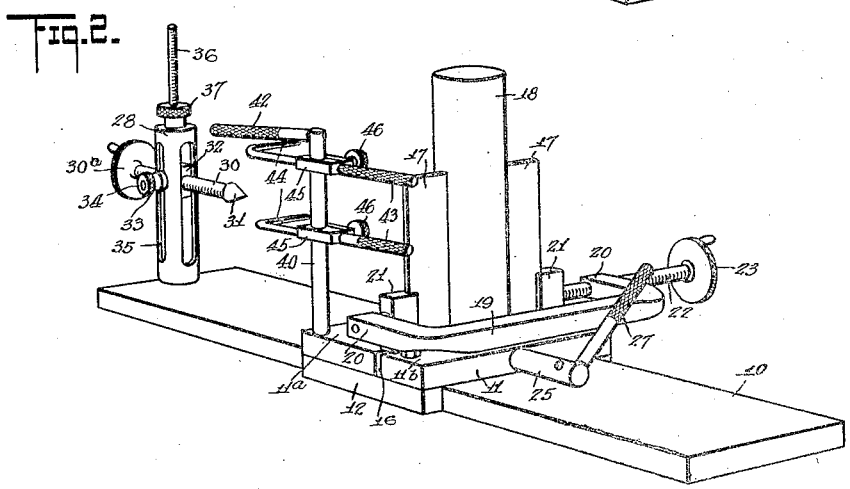
Fig. 2.
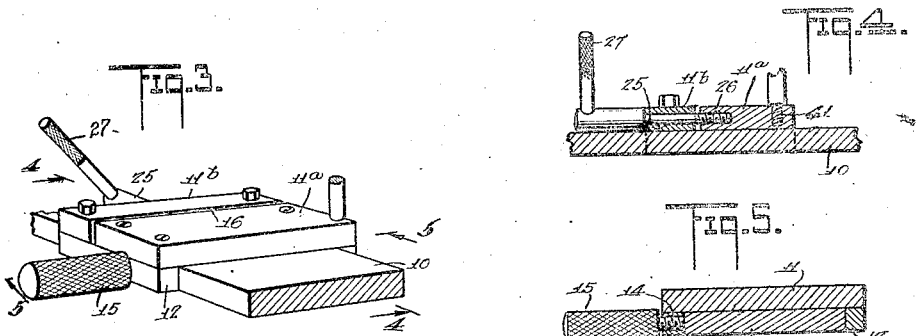
Fig. 3.
Fig. 4.
Fig. 5.
WITNESSES
INVENTOR
Harry A. Miller,
BY
ATTORNEYS

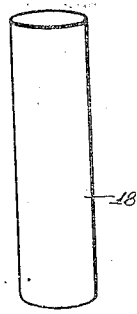
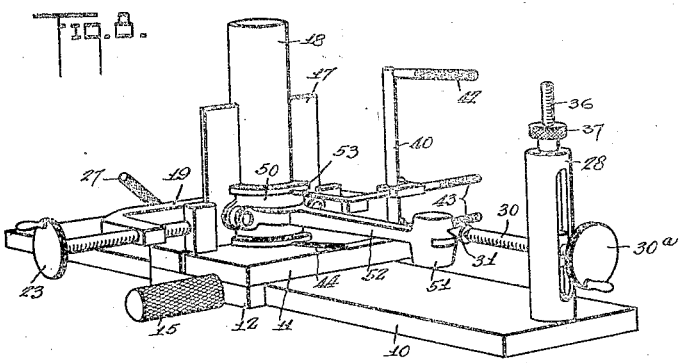
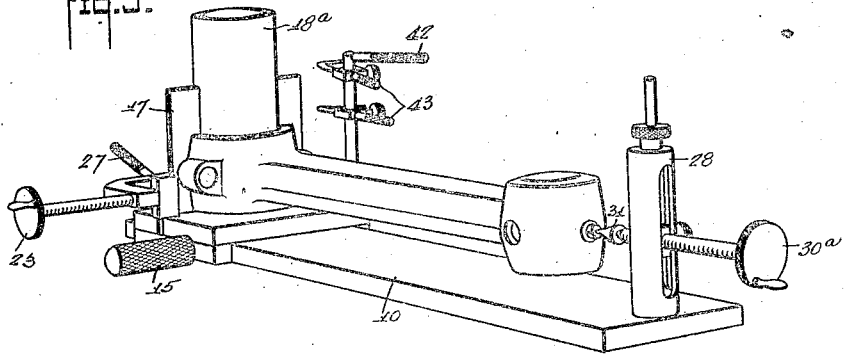

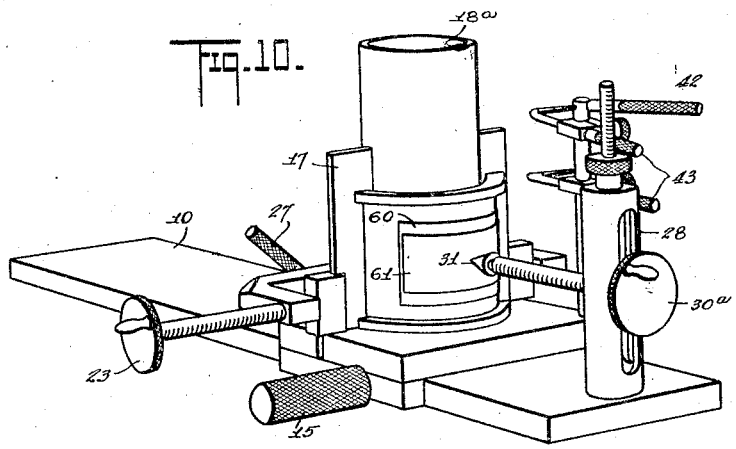
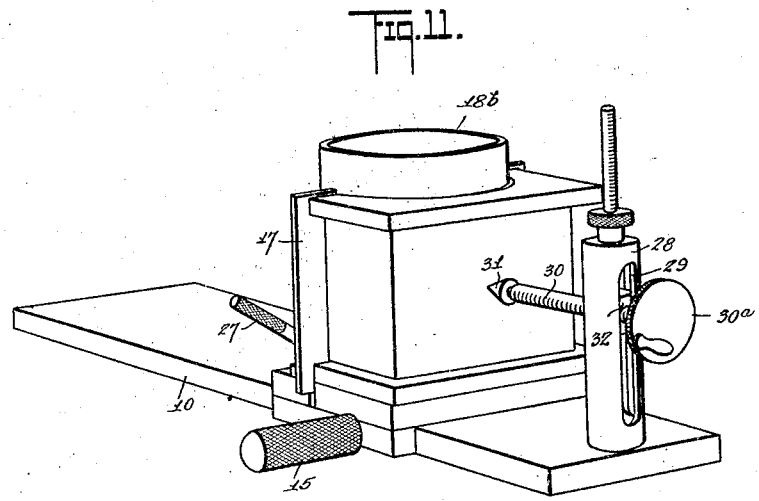

Patented Aug. 31, 1926.

1,598,540

UNITED STATES PATENT OFFICE.

HARRY A. MILLER, OF CLOVIS, NEW MEXICO.

BABBITTING JIG.

Application filed November 27, 1925. Serial No. 71,716.

The present invention relates to a babbitting jig of universal adaptability for the reception of any conventional type of bearing to be rebabbitted.

A more specific object of the invention is to provide a babbitting jig which is adjustable to properly support connecting rods, bronze backs and other forms of sectional bearings in proper position to be rebabbitted, and a jig in which the adjustments may be manually made with expedition, and in which the work will be firmly and accurately held in proper position.

A further object is to provide a universal babbitting jig of simple, practical construction, which will be rugged, durable and efficient in use, which may be manufactured with comparative economy, and which will eliminate the necessity for investing in numerous types of special babbitting jigs.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view of a babbitting jig embodying the invention.

Fig. 2 is a similar view with the position of the jig reversed.

Fig. 3 is an enlarged perspective detail showing the manner of mounting the slide on the bed plate.

Fig. 4 is a longitudinal sectional detail on the line 4—4 of Fig. 3.

Fig. 5 is a view in transverse section on the line 5—5 of Fig. 3.

Fig. 6 is a perspective view of the mandrel.

Fig. 7 is a perspective view of one of the mandrel clamping gauge plates.

Fig. 8 is a view similar to Fig. 1 showing a connecting rod supported in the jig.

Fig. 9 is a similar view showing the large tractor connecting rod mounted in the jig with the ring clamping arms swung to inoperative position.

Fig. 10 is a perspective view showing a large tractor bronze back shell in position for pouring of the metal.

Fig. 11 is a view similar to Fig. 10, but showing a crank brass for a steam engine secured in position.

In the drawings the reference character 10 represents an elongated bed plate upon which a slide 11 is mounted. The slide includes depending side flanges 12 embracing the bed plate. A binding screw 14 carrying an enlarged knurled head 15 works through one of the flanges 12 and engages the bed plate to lock the slide against movement. The slide is formed of a pair of plate-like sections $11^a$, $11^b$ defining between them a groove 16 for the reception of the lower edges of gauge plates 17 adapted to receive and clamp a vertical mandrel 18 between them. In the illustrated embodiment of the invention, a mandrel simply rests upon the slide 11 and is frictionally clamped between the two gauge plates 17 which in turn are clamped between the sections of the slide. Obviously other expedients might be resorted to for securing the mandrel.

A U-shaped clamping member 19 includes arms 20 carrying grooved blocks 21 which engage the outer edges of the plates 17. One of the blocks is borne by an adjusting screw 22 formed with an operating hand wheel 23. As seen in Figs. 1 and 2, the mandrel 18, plates 17, and clamping member 19 are secured together as a unit by rotating the hand wheel 23, and are free to slide in the groove 16. To lock this sliding unit against movement, the slide section $11^b$ rotatably mounts a screw 25, the threaded end 26 of which works in a tapped opening in the rear of the slide member $11^a$. A lever handle 27 carried by the screw 25 is used for effecting relative adjustments of the slide sections toward and from each other, whereby to firmly clamp the edges of the plates 17 and lock the mandrel unit against sliding movement.

Secured upon one end of the bed plate is a post 28 preferably open at its lower end, and of cylindrical internal shape. Throughout the major portion of its length, the post is provided with a pair of diametrically aligned vertical slots 29 to provide for vertical movement of a horizontal clamping screw 30 carrying a conical clamping head 31 at its free end. The screw is mounted in a block 32 vertically slidable in the post 28. The block 32 has a limited turning movement in its cylindrical guideway, so that the screw 30 may be swung horizontally to an extent limited by the engagement of the screw with the walls of the slots 29. A binding nut 33 working on a stud 34 carried by the block 32 and projecting radially through a third slot 35 in the post, is adapted to lock the screw 30 in any position of horizontal adjustment. Slot 35 is sufficiently larger than the diameter of stud 34 so as not to interfere with the horizontal rocking adjustment of screw 30. The block 32 may be carried on a vertically adjustable screw 36 working through the top of the post 28, and locked in any desired position by binding nut 37.

The slight horizontal adjustment of the screw 30 is particularly desirable when the nature of the work renders it difficult for the screw to properly clamp the work at the center, due to the presence of projections or rounded surfaces at the point to be engaged by the conical head 31.

Mounted on the outer corner of the section "a" of the slide 11, is a standard 40, the lower threaded end 41 of which enters a threaded socket in the base. A handle lever 42 at the upper end of the standard facilitates the ready removal thereof from its socket. A pair of ring clamping arms 43 carrying angular clamping fingers 44 are mounted in blocks 45 slidably and rotatably adjustable on the standard 40, these blocks being locked in adjusted position on the standard by clamping screws 46. The ring retaining fingers 44 are particularly useful when a connecting rod bearing is to be rebabbitted, as best illustrated in Fig. 8. Here it will be noted that the split bearing 50 to be rebabbitted, encircles the mandrel 18. The wrist pin bearing 51, which forms a part of the connecting rod 52 is engaged by the head 31 of the screw 30, screw 30 having been adjusted to the proper horizontal position and projected forwardly by its hand wheel 30ª. It is customary to babbitt not only the inner face, but the end face of the bearing 50, and with this end in view, the arms 43 are positioned so that the fingers 44 engage semi-circular moulding rings 53, defining a mold for the Babbitt metal, which spreads over the end faces of the bearing 50 as is well understood in the art. With the connecting rod properly centered about the mandrel, and secured as in Fig. 8, the Babbitt metal may be poured between the mandrel and the bearing 50, and the usual rebabbitting operation accomplished.

In Fig. 9 the mechanism is substantially the same, but I have shown a large sized tractor connecting rod in place. In this instance a larger mandrel 18ª is used, and this mandrel may conveniently be tubular instead of solid as in the case of the mandrel 18. In Fig. 9 also I have shown the arms 43 swung to inoperative position where they will not interfere with the proper manipulation of a ladle for applying the metal.

In Fig. 10 I have shown a large tractor bronze back shell in position for pouring of the metal. The usual oil holes (not shown) in the bronze back are closed by the use of a piece of blotting paper 60, backed by thin sheet metal member 61, so that there can be no leakage of metal outwardly through the holes.

For accommodating a large sized crank brass for steam engines, such as is shown in Fig. 11, it is of course necessary to use a larger sized mandrel 18ᵇ, and to somewhat dismantle the jig in order to accommodate for the brass. It will be noted in Fig. 11 that I dispense with the clamp 19, and that the post 40 and its associated ring clamping arms have been removed.

While it is believed that the manner of adjusting the jig to receive various types of work will be substantially understood from the foregoing description, the method of making the adjustments may be briefly reenumerated as follows:

The screw 15 is first released and the slide 11 moved along the base to the proper distance from the post 28. The work is then placed in position and properly centered by releasing the locking lever 27 and laterally shifting the mandrel unit until similar scale marks on each block 17 register with the edges of the semi-circular work. The lever 27 is then swung to lock the mandrel unit in proper position. The screw 30 is horizontally adjusted to the proper height, and then projected forwardly by turning the hand wheel 30ª causing the conical head 31 to engage the work and hold the same firmly against the plates 17. In the case of a connecting rod, or other type of bearing where babbitted flanges are to be formed at the bearing ends, the flange forming rings 53 are properly positioned, and the arms 43 moved to the correct elevation and then rotated on the posts to bring the fingers 44 into ring engaging position as seen in Fig. 8.

From the foregoing description it will be evident that my improved babbitting jig is of substantially universal adaptability, and that it will eliminate the necessity for keeping on hand a number of special jigs designed for special work. It is to be understood that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim:—

1. A babbitting jig including a bed plate, a slide mounted on the bed plate, and formed with separable sections, mandrel centering gauge plates adapted to have their lower edges clamped between the sections of the slide, and a mandrel mounted between said gauge plates.

2. A babbitting jig including a bed plate, a slide mounted on the bed plate, and formed with separable sections, mandrel centering gauge plates adapted to have their lower edges clamped between the the sections of the slide, and a mandrel mounted between said gauge plates, means for locking the slide in any position of adjustment on the bed plate.

3. A babbitting jig including a bed plate, a slide mounted on the bed plate, and formed with separable sections, mandrel centering gauge plates adapted to have their lower edges clamped between the sections of the slide, and a mandrel mounted between said gauge plates, a screw rotatable in one section of the slide and threadedly engaged with the other section of the slide, and a handle lever on the screw whereby to effect relative advance or separation of the slide sections toward or from each other.

4. A babbitting jig including a bed plate, a slide mounted on the bed plate, and formed with separable sections, mandrel centering gauge plates adapted to have their lower edges clamped between the sections of the slide, and a mandrel mounted between said gauge plates, an adjustable clamping member including grooved blocks engaging the outer edges of the gauge plates, whereby the mandrel unit including the mandrel gauge plates and clamping member, may be shifted as a unit between the sections of the slide.

5. A babbitting jig including a bed plate, a slide mounted on the bed plate, and formed with separable sections, mandrel centering gauge plates adapted to have their lower edges clamped between the sections of the slide, and a mandrel mounted between said gauge plates, a post secured on the slide, and a plurality of fingers slidably and rotatably adjustable on the post and adapted to be moved to hold the flange forming rings on a semi-circular bearing in which the mandrel is centered.

6. A babbitting jig including a bed plate, a slide mounted thereon, and including relatively separable platform sections, a vertical mandrel on the slide, gauge plates having their lower ends disposed between the sections of the slide, and clamping the mandrel between them, a U-shaped clamping member including relatively adjustable blocks in the arms thereof engagable with the outer edges of the gauge plates to force the gauge plates into clamping relation with the mandrel, and means for adjusting the slide sections to clamp the lower edges of the gauge plates between them.

7. A babbitting jig including a bed plate, a slide mounted thereon, and including relatively separable platform sections, a vertical mandrel on the slide, gauge plates having their lower ends disposed between the sections of the slide, and clamping the mandrel between them, a U-shaped clamping member including relatively adjustable blocks in the arms thereof engagable with the outer edges of the gauge plates to force the gauge plates into clamping relation with the mandrel, and means for adjusting the slide sections to clamp the lower edges of the gauge plates between them, said gauge plates having scale marks at their lower edges for centering one section of a sectional bearing relative to the mandrel.

8. A babbitting jig including a bed plate, a slide on the bed plate, a mandrel carried on the slide, a post rising from one end of the bed plate and carrying an adjustable member adapted to engage work centered relative to the mandrel.

9. A babbitting jig including a bed plate, a slide on the bed plate, a mandrel carried on the slide, a post rising from one end of the bed plate and carrying an adjustable member adapted to engage work centered relative to the mandrel, said adjustable member including a screw disposed in horizontal position, and mounted for vertical adjustment in the post.

10. A babbitting jig including a bed plate, a slide on the bed plate, a mandrel carried on the slide, a post rising from one end of the bed plate and carrying an adjustable member adapted to engage work centered relative to the mandrel, said adjustable member including a screw disposed in horizontal position, and mounted for vertical adjustment in the post, said screw having a slight horizontal rocking adjustment whereby to engage the work either at the center or off center.

11. A babbitting jig including a bed plate, a slide on the bed plate, a vertical mandrel on the slide, a post at one end of the plate, an adjustable screw carried by the post and engageable with work centered relative to the mandrel, a second post mounted on the slide, and fingers carried by said post adapted to be swung to position to engage flange forming rings associated with the work centered between the mandrel and the screw.

12. A babbitting jig including a bed, a slide mounted on the bed, mandrel centering gauge plates adjustably mounted on the slide and a mandrel clamped between the gauge plates.

13. A babbitting jig including a bed, a slide mounted on the bed and formed with separable sections, gauge plates adapted to have their lower edges clamped between the sections of the slide and a mandrel mounted on the slide in operative relation to the gauge plates.

14. A babbitting jig including a bed, a slide on the bed, a vertical mandrel on the slide, a post mounted on the slide, fingers carried by said post adapted to be moved to proper position to engage flange forming rings associated with the work centered on the mandrel.

15. A babbitting jig including a bed, a slide on the bed, a vertical mandrel on the slide, a post mounted on the slide, fingers carried by said post adapted to be moved to proper position to engage flange forming rings associated with the work centered on the mandrel, said fingers being pivotally mounted on the post for swinging movement in a horizontal plane.

16. A babbitting jig including a bed, a slide on the bed, a vertical mandrel on the slide, a post mounted on the slide, fingers carried by said post adapted to be moved to proper position to engage flange forming rings associated with the work centered on the mandrel, said fingers being pivotally mounted on the post for swinging movement in a horizontal plane, and being vertically adjustable on the post.

17. A babbitting jig, including a bed plate, a slide mounted on the bed plate and formed with separable sections, mandrel centering gauge plates adapted to have their lower edges clamped between the sections of the slide, a mandrel mounted between the gauge plates, a post, and a plurality of fingers adjustable on the post and adapted to be moved into position to ho'd flange forming rings on a semi-circular bearing centered on the mandrel.

HARRY A. MILLER.